US006680669B1

(12) United States Patent
Terry

(10) Patent No.: US 6,680,669 B1
(45) Date of Patent: Jan. 20, 2004

(54) REMOTELY RELEASABLE SECURITY SYSTEM

(76) Inventor: Dan Terry, P.O. Box 12279, Mill Creek, WA (US) 98082

(*) Notice: Subject to any disclaimer, the term of this patent is extended or adjusted under 35 U.S.C. 154(b) by 400 days.

(21) Appl. No.: 09/796,376

(22) Filed: Feb. 28, 2001

(51) Int. Cl.[7] .................................... G05B 23/00
(52) U.S. Cl. .................................... 340/5.64; 49/463
(58) Field of Search .................... 340/5.64; 49/463, 49/464, 465, 57, 55, 379, 394

(56) References Cited

U.S. PATENT DOCUMENTS 5,018,302 A * 5/1991 Kluge .......................... 49/56
5,301,734 A * 4/1994 Opel .......................... 160/100

* cited by examiner

*Primary Examiner*—Michael Horabik
*Assistant Examiner*—M Shimizu
(74) *Attorney, Agent, or Firm*—Davis Wright Tremaine LLP

(57) ABSTRACT

A remotely releasable security system for securing a barrier across a window opening to prevent unauthorized access to the interior of a building via a window, and to permit removal of the barrier for escape in an emergency or for maintenance. The security system includes a security barrier, a locking mechanism for securing the barrier to a window frame, a radiant energy receiver operably connected to the locking mechanism, and a radiant energy remote control transmitter for signaling the receiver to release the locking mechanism so that the barrier may be removed.

4 Claims, 6 Drawing Sheets

REMOTELY RELEASABLE SECURITY SYSTEM

TECHNICAL FIELD OF THE INVENTION

This invention relates to a window security system for preventing the unauthorized entry into the interior of a building through a window, and more particularly to a window security system which is releasable from a locked position by means of a radiant energy remote control device to permit occupants of a building to escape in an emergency situation, or for ease of maintenance and cleaning.

BACKGROUND OF THE INVENTION

Window security barriers have long been employed to minimize or eliminate the risk of unauthorized entry into a building via a window. In the past, steel bars rigidly secured over a window provided the desired security. More recently, in response to safety concerns, fixed barrier systems have been replaced by lockable security systems capable of being removed or opened in the event of an emergency situation. In fact, many local building and fire codes now prohibit the use of fixed security barriers which prevent an individual from utilizing a window for escape in an emergency.

To this end, a variety of designs have been employed to provide a security system that will prevent an individual from gaining access to the interior of a building via a window, while at the same time permitting the security barrier to be removed or opened for escape, via the same window, in the event of an emergency. The common design of these systems is such that they provide a means of securing the barrier over the window in such a way as to prevent an individual from tampering with the locking mechanism from a position outside the window, while permitting an individual on the inside of the window to remove the barrier and escape in an emergency, or for maintenance of the window or barrier system itself.

Of primary concern in the design of a non-fixed window security system is the ease of use, and the speed with which the security barrier may be removed or opened to provide an avenue of escape in an emergency situation. This consideration must account for the possible presence of smoke or fire that may make conditions unfavorable. In such circumstances it may be difficult for an individual to locate a key, or to have the time to operate a complicated unlocking mechanism.

The present invention therefore provides a novel remotely operated window locking system in conjunction with a security barrier that provides high security in a locked position, and is easily removable for emergency escape, or for maintenance.

SUMMARY OF THE INVENTION

It is an object of the present invention to provide a remotely operated window locking system for use with a security barrier to reduce or eliminate the risk of unauthorized entry via a window, while at the same time providing for rapid and easy removal of the barrier system in the event of an emergency, or for ease of maintenance or cleaning.

The window locking system of the present invention is electronically activated by means of a remote radiant energy transmitter in combination with a radiant energy receiver electronically coupled to a locking mechanism. In a preferred embodiment of the present invention, the locking mechanism is comprised of a male/female aluminum lock set in line with a shear pin interference mechanism. A double acting solenoid throws a pair of shear pins between the male/female lock set bonding them together. A pair of compression springs positioned between a first section and a second section of a horizontal mullion in which the locking mechanism is mounted, pushes the first and second sections of the horizontal mullion apart upon retraction of the shear pins via actuation of the transmitter.

It is a further object of the invention to provide a security barrier that has the outward appearance of being in a locked position even when unlocked. A preferred embodiment of the present invention provides a fail safe that unlocks the security barrier prior to failure of the battery power in the radiant energy transmitter, or connected to the receiver/pc board. The system is attached to, and designed to rest on the windowsill. When unlocked and in a released position, the first section of the lower horizontal mullion is physically disconnected from the secured second section, but remains positioned close to the second section in order to give the appearance of continuity. The fail safe ensures that an individual will not be trapped inside a building by the security barrier in an emergency situation because of a battery failure, while at the same time maintaining the appearance of security to would-be intruders.

Other objects, advantages, and features of the present invention will be apparent to the reader from the foregoing and the appended claims, and as the ensuing detailed description and discussion is read in conjunction with the accompanying drawings.

BRIEF DESCRIPTION OF THE VARIOUS VIEWS OF THE DRAWINGS

In the drawings, like reference numerals refer to like parts throughout the various views, and wherein.

Figure 8:
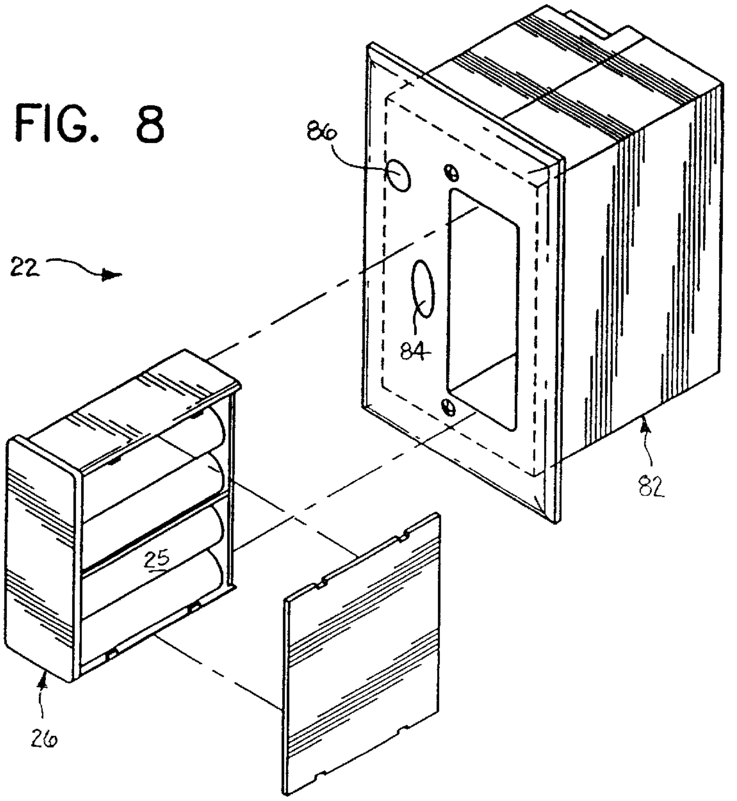
Figure 9:
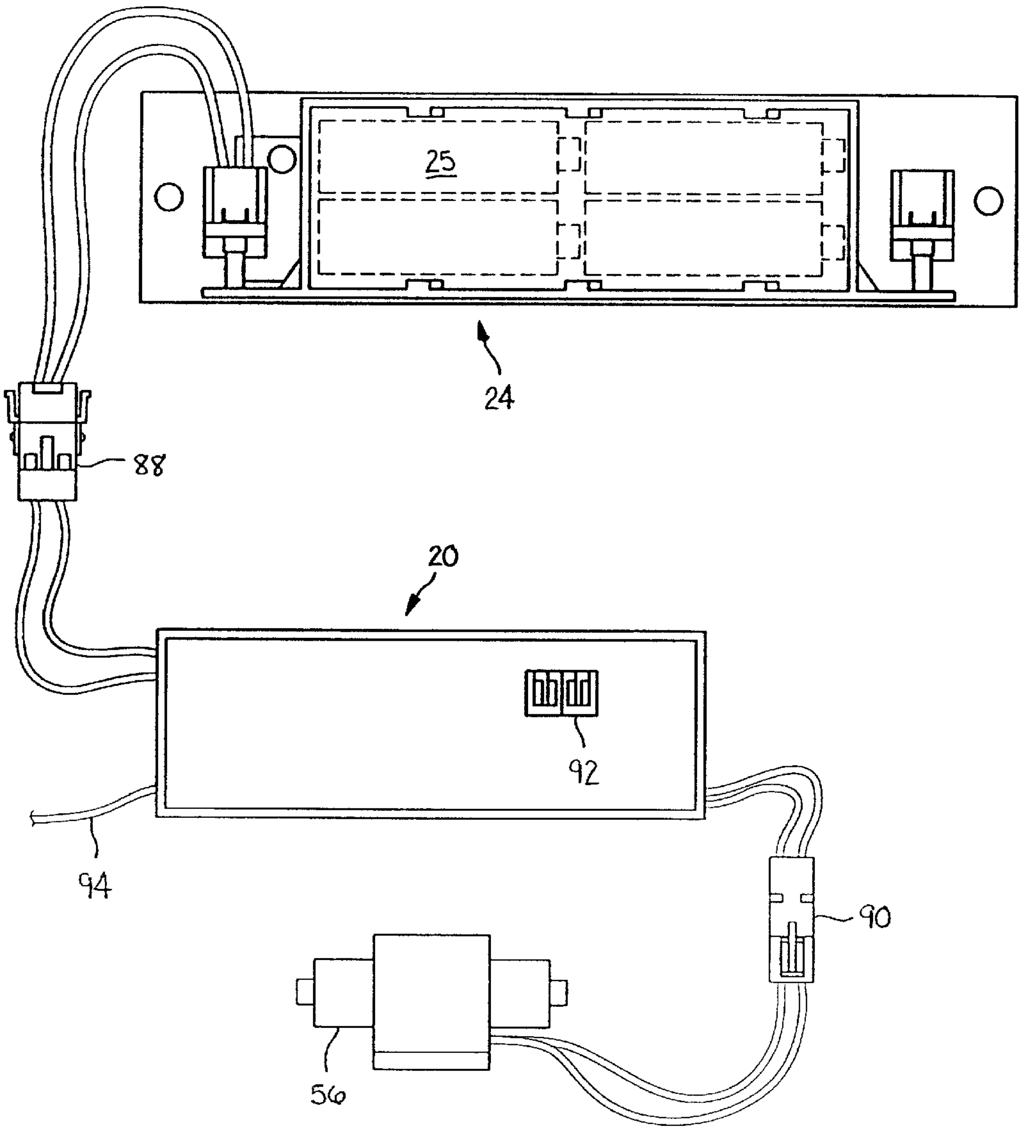

FIG. 8 is a partially exploded perspective view of a radiant energy remote control transmitter device in accordance with the principles of the present invention illustrating the relationship of the battery supply to the remote control housing; and FIG. 9 is an illustration showing the interrelationship of the receiver battery supply, a single receiver/pc board, and a single solenoid which comprises a portion of a lock set in accordance with the principles of the present invention.

DETAILED DESCRIPTION OF THE INVENTION

Figure 1:
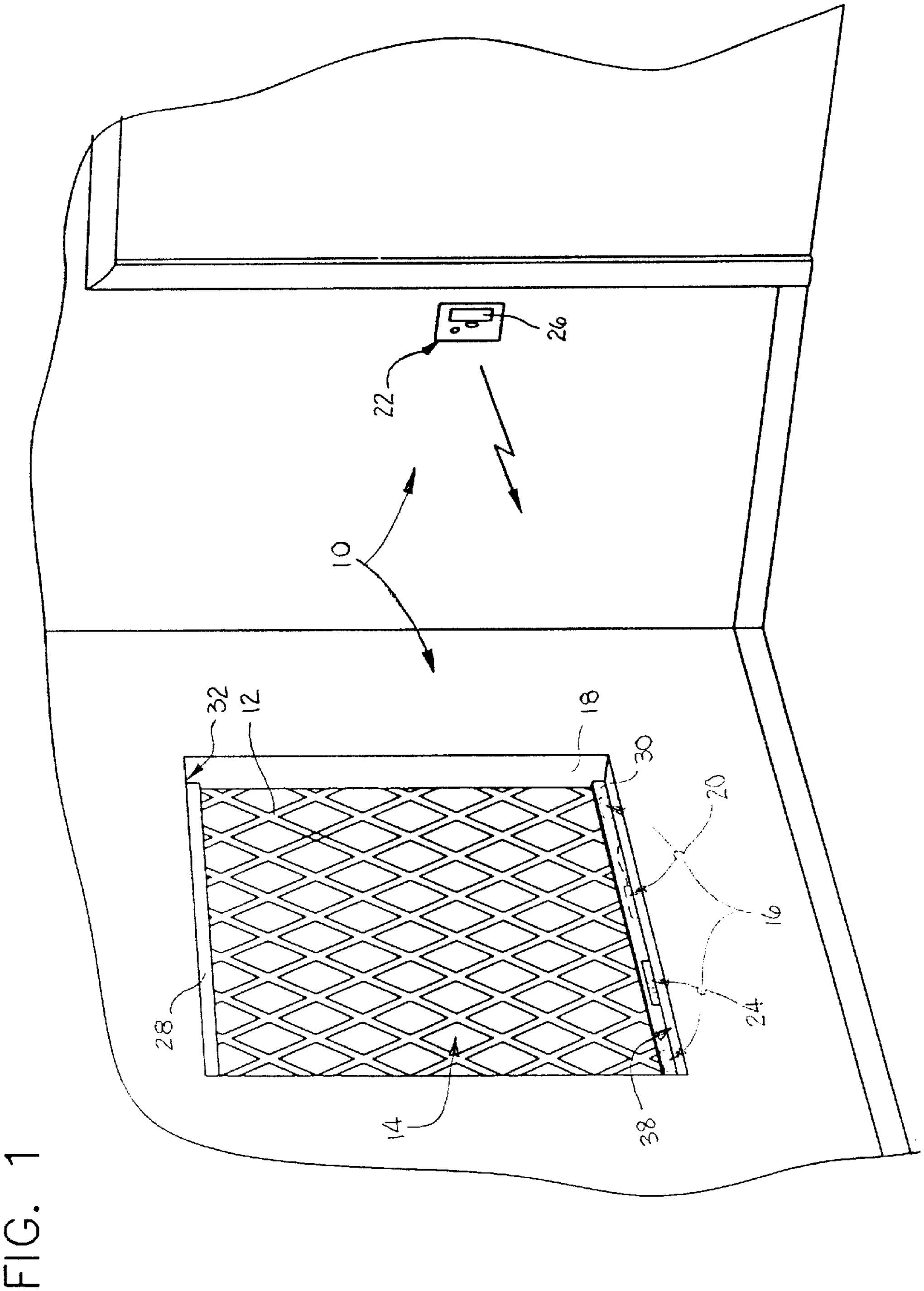
FIG. 1 is a pictorial illustration of an embodiment of a window locking system in accordance with the principles of the present invention positioned within the interior of a building, and in relation to a window located therein.

Referring now to the drawings, and in particular to FIG. 1 there is illustrated a remotely releasable security system generally at 10 in accordance with the principles of the present invention. The security system 10 is comprised of a security barrier 12 positioned across a window opening 14 in a manner which prevents the entry of unauthorized individuals therethrough, a locking mechanism 16 for releasably securing the security barrier 12 to a window frame 18 which defines the window opening 14, a radiant energy receiver/pc board 20 operably connected to the locking mechanism 16, and a radiant energy remote control transmitter 22 for signaling the receiver 20 to release the locking mechanism 16. The power supplies for the radiant energy receiver and remote control transmitter are contained in battery compartments 24 and 26 respectively which may be easily removed for replacement of the batteries therein.

Figure 2:
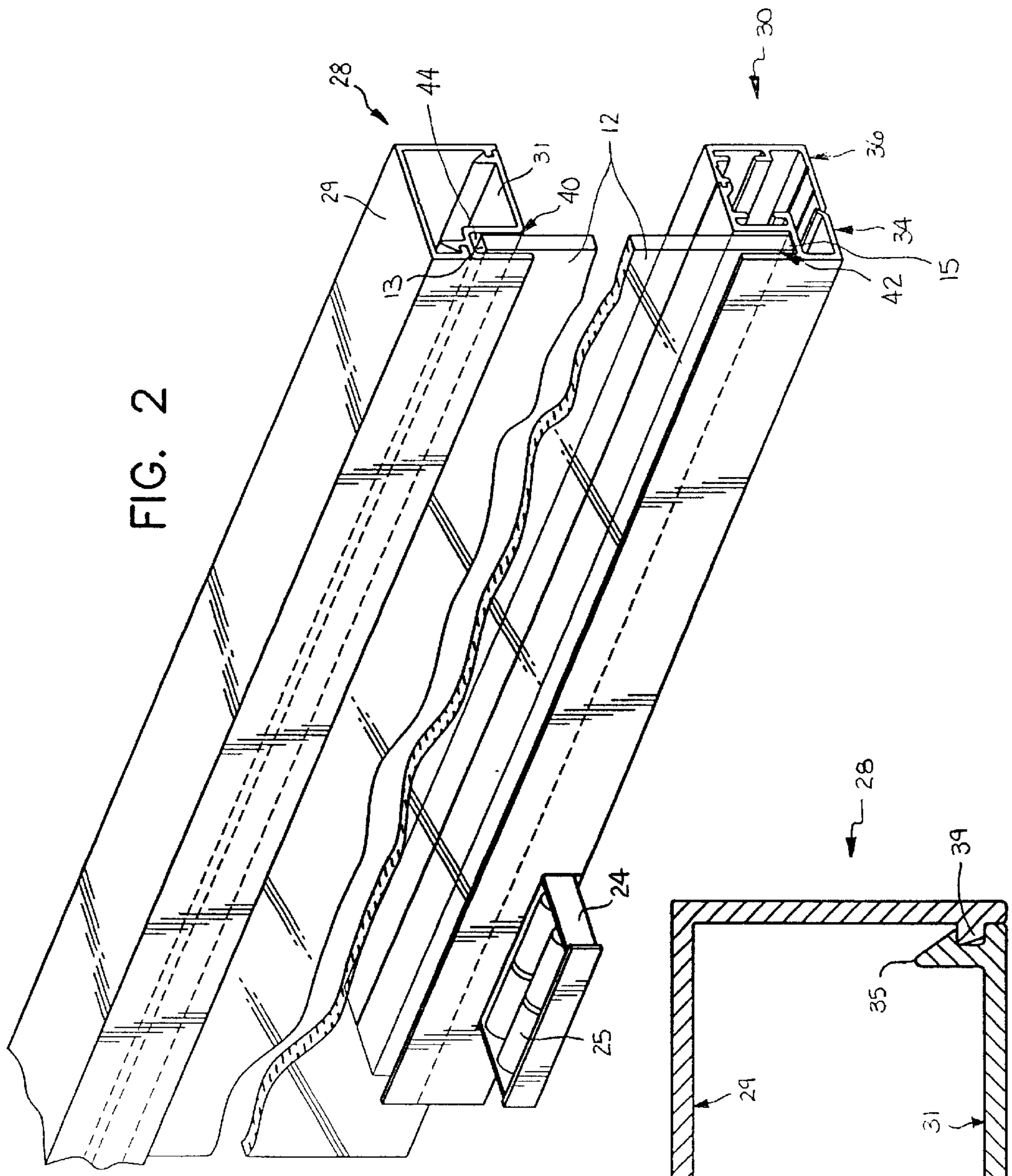
FIG. 2 is a front, right perspective partial view of the window locking system illustrating the interrelationship of a security barrier with the horizontal mullions which retain the barrier in relation to the window opening.
Figure 2A:
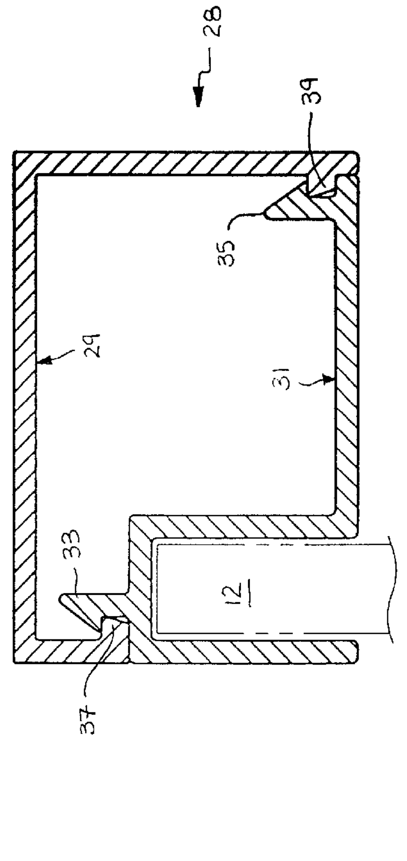
FIG. 2A is a cross-sectional view of the upper horizontal mullion illustrated in FIG. 2.

Having observed the general components of the remotely releasable security system of the present invention and their relationship to one another, attention may now be given to the details of the security system itself, and to the locking mechanism in particular. The operation of the security system of the present invention may be understood upon reference to FIG. 2 which illustrates a pair of horizontal mullions 28, 30 that hold the security barrier 12 in place across a window opening. The upper horizontal mullion 28 is preferably comprised of a pair of extruded aluminum sections 29, 31 which are secured to the top portion 32 (see FIG. 1) of a window frame defining a window opening 14 (see FIG. 1) over which a user wishes to place a security barrier. Extruded aluminum is generally preferred because of its cost-effectiveness and strength, but other materials may also be used. The top section 29 of the upper horizontal mullion 28 is secured by fasteners such as screws or the like into the window header, and the bottom section 31 is then fixed to the rear section by snapping it in place. With reference to FIG. 2A, a pair of flexible projecting members 33, 35 engage a pair of ridges 37, 39 to hold the top and bottom sections 29, 31 of upper horizontal mullion 28 together. This arrangement enhances the aesthetic qualities of the security system by concealing the fasteners from view, and also provides added security against tampering.

The lower horizontal mullion 30 is preferably comprised of a first section 34, and a second section 36. Both the first and second sections are each preferably comprised of a single piece of extruded aluminum as described above. In operation, the second section 36 is secured to the window sill 38 (see FIG. 1) of a window frame by fasteners in a manner like that of the upper horizontal mullion 28. Both the upper horizontal mullion 28 and the first section 34 of the lower horizontal mullion 30 are designed to incorporate a channel, indicated at reference numerals 40 and 42 respectively, for receiving the upper and lower ends, 13 and 15 respectively, of security barrier 12. The height of the security barrier 12 is such that a gap 44 remains between the upper end 13 of the security barrier 12 and the horizontal surface of channel 40. This gap 44 permits a user of the security system to insert the security barrier across the window opening, or to remove the unlocked security barrier 12 and first section 34 of lower horizontal mullion 30 for escape through the window in an emergency situation, or for easy maintenance and cleaning of the barrier or the interior of the window over which the barrier is fixed. The lower end 15 of the security barrier 12 is mechanically bonded to the first section 34 of lower horizontal mullion 30 by press fitting or other means, and is held in place by channel 42 which extends along the length thereof. To place the security barrier over a window, a user simply slips the upper end 13 of the security barrier 12 into the channel 40 in upper horizontal mullion 28 while the first section 34 of lower horizontal mullion 30 is off of, and below the windowsill 38 (see FIG. 1). By utilizing the gap 44, the user is able to easily position and trap the first section 34 of the lower horizontal mullion 30 on the windowsill 38 (see FIG. 1) in proximity to the secured second section 36, and to remove the same in a like manner. The interaction of the first and second sections 34, 36 of the lower horizontal mullion 30 are more clearly illustrated in combination with the locking mechanism 16 (see FIG. 1) in FIGS. 3–7 which are described in greater detail hereinbelow.

Figure 3:
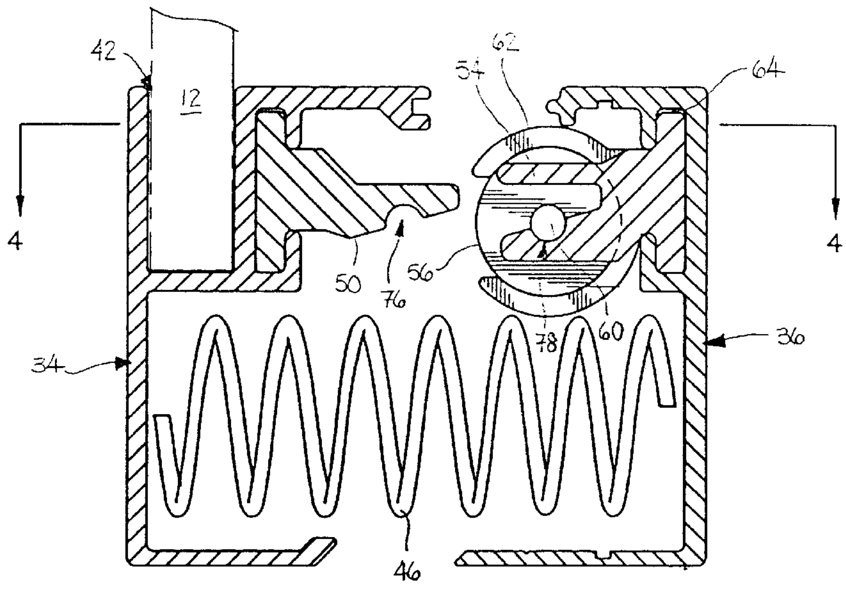
FIG. 3 is a right side elevational view of the lower horizontal mullion in an unlocked position.
Figure 4:
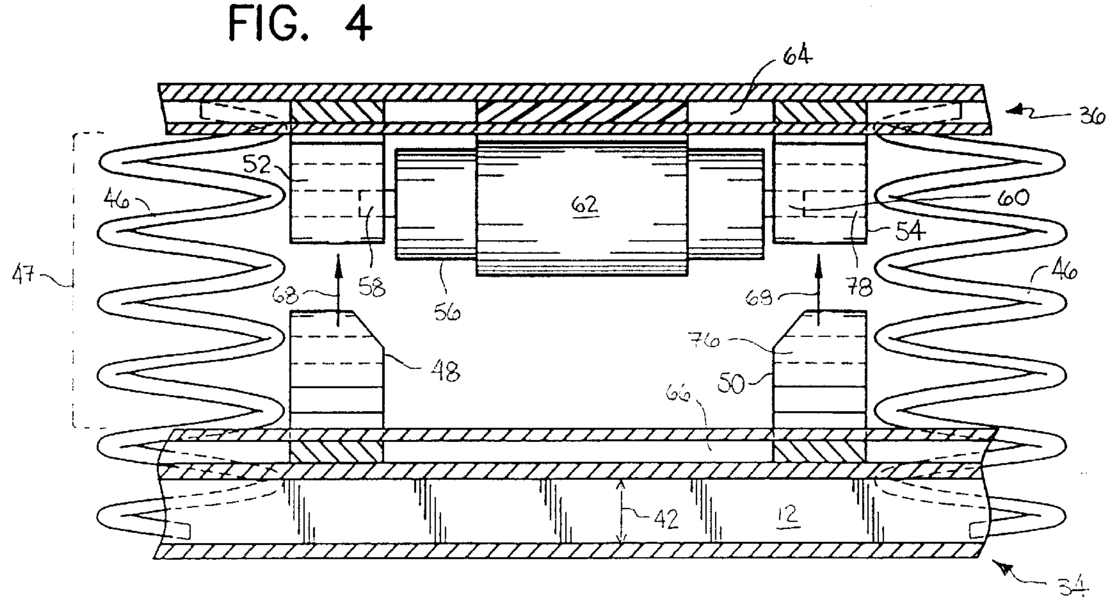
FIG. 4 is a top cutaway view of the lower horizontal mullion taken substantially along line 4—4 of FIG. 3 showing the front and rear sections in an unlocked position.

Referring now primarily to FIGS. 3 and 4, first section 34 and second section 36 of the lower horizontal mullion are biased to a released position by a pair of compression springs 46 located at either end of lock set 47. The springs 46 push the first and second sections 34, 36 apart when the locking mechanism is disengaged. Each lock set 47 of the locking mechanism 16 (the locking mechanism may consist of one or more lock sets, preferably at least two, as illustrated in FIG. 1), is comprised of a pair of flanged male lock elements 48, 50, a pair of flanged female lock elements 52, 54, and a solenoid 56 which comprises a pair of shear pins 58, 60. The shear pins 58, 60 hold the pairs of male and female lock elements 48, 52, and 50, 54 together when the first and second sections 34, 36 of the lower horizontal mullion are engaged. The solenoid is held in place by a flanged bracket element 62 which is designed to be received in a t-slot channel 64 formed into the extruded aluminum second section 36 of the lower horizontal mullion. This t-slot channel 64 also receives the flanged female lock elements 52, 54 on either side of the flanged bracket element 62. A similar t-slot channel 66 is formed into the extruded aluminum first section 34 of the lower horizontal mullion for receiving the flanged male lock elements 48, 50 in a manner such that the male and female lock elements are capable of engaging the shear pins 58, 60 when the first and second sections 34, 36 of the lower horizontal mullion are pushed together by a user in the direction of the arrows having reference numeral 68.

Figure 5:
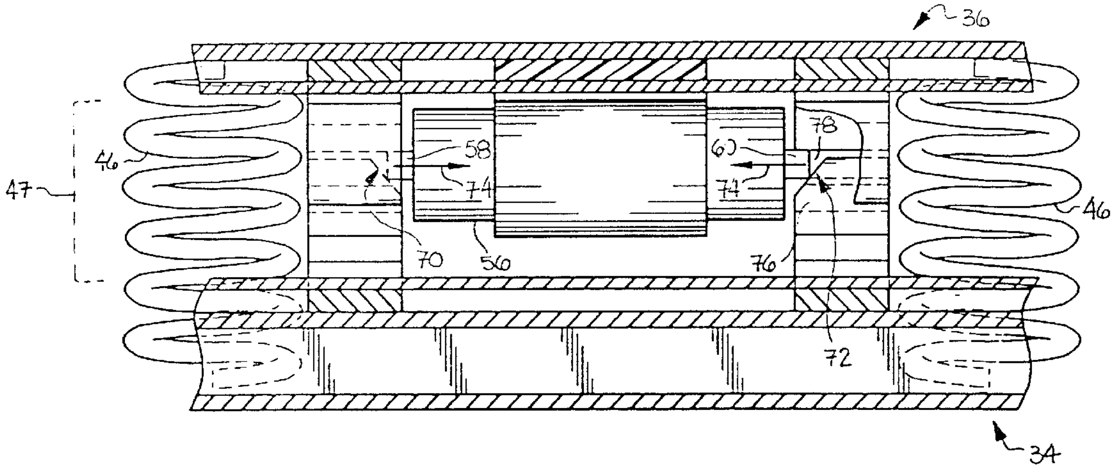
FIG. 5 is a view like FIG. 4 showing the first and second sections in a semi-engaged position.
Figure 6:
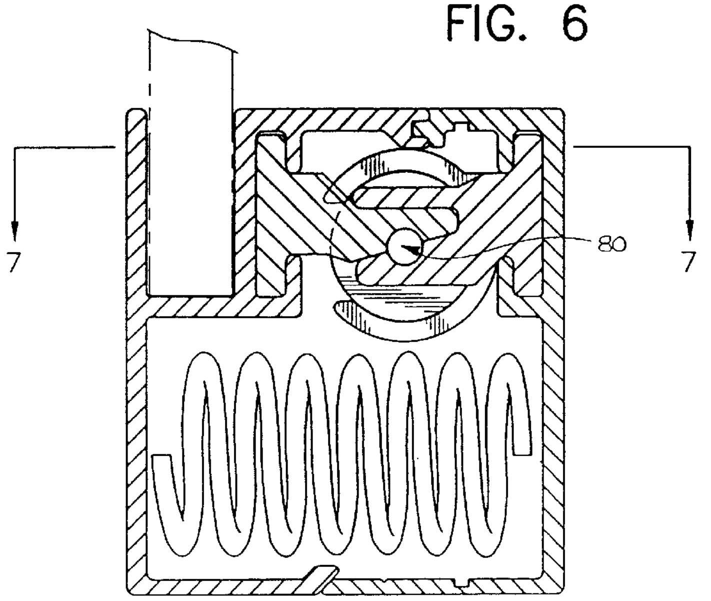
FIG. 6 is a right side elevational view of the lower horizontal mullion in a locked position.
Figure 7:
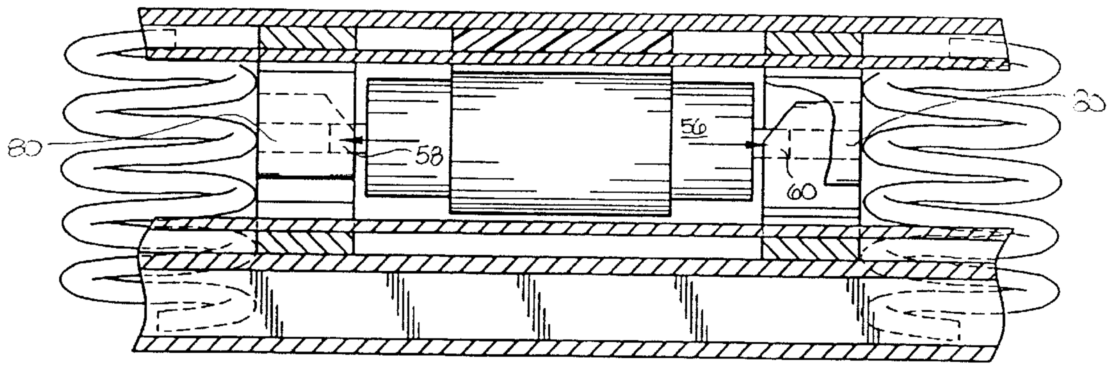
FIG. 7 is a top cutaway view of the lower horizontal mullion taken substantially along line 7—7 of FIG. 6 showing the first and second sections in a locked position.

FIG. 5 illustrates the movement of the shear pins 58, 60 of the lock set 47 when a user pushes the first section 34 into the secured second section 36 (see Arrow 68 in FIG. 4). As the male lock elements 48, 50 engage the female lock elements 52, 54, a beveled edge 70, 72 on each male lock element 48, 50 respectively, pushes the shear pins 58, 60 into the solenoid 56 in the direction of the arrows having reference numeral 74. This movement of the shear pins allows the male lock elements 48, 50 to engage the female lock elements 52, 54 to a point where a pair of corresponding semi-circular grooves 76, 78 (in the male and female lock elements respectively, see FIGS. 3–5) form a cylindrical channel 80 into which the shear pins 58, 60 extend, locking the male and female lock elements together and securing the first section 34 of the lower horizontal mullion to the fixed second section 36 thereof and thereby locking the security barrier 12 across the window opening. The shear pins 58, 60 are biased to extend into the cylindrical channel 80 formed in each pair of engaged male/female lock elements on either side of the solenoid 56.

Actuation of the radiant energy remote control transmitter 22 (see FIG. 1) signals the solenoid 56 to retract the shear pins 58, 60 for a period of time thereby causing the pair of compression springs 46 to push the first section 34 and the second section 36 of the lower horizontal mullion apart, disengaging the male/female lock elements and releasing the security barrier so that it may be removed for emergency escape through the window, or for maintenance or cleaning thereof. A user need only push the first section 34 back against the second section 36 to re-engage the lock elements and lock the security barrier in place once again.

The radiant energy remote control transmitter 22, shown generally at FIG. 8 in a partially exploded view, is comprised of a housing 82, a battery compartment 26 which contains four alkaline batteries 25, an actuatable button 84, and a low-battery indicator LED 86. Actuation of the button 84 causes a radiant energy signal, preferably radio frequency, to be transmitted to the radiant energy receiver/pc board 20 (see FIGS. 1 and 9). Radio frequency signals are preferred because they are capable of passing through curtains, flame, smoke, or other obstructions that may be present between the radiant energy transmitter 22 and receiver 20. The receiver/pc board 20 receives the transmitted signal and provides an output to the solenoid 56 of each lock set 47 connected thereto causing the shear pins 58, 60 to be retracted, thereby unlocking the security barrier so that it may be removed from the window opening. Each receiver/pc board 20 is preferably connected to two locking mechanisms 16 as illustrated in FIG. 1. For wider windows, two or more receiver/pc boards may be employed in combination with sets of locking mechanisms to provide a secure barrier across the entire width of the window.

The remote control transmitter 22 is preferably designed as a standard switch-plate box which may be installed in a wall adjacent to, or across from, the secured window. The battery compartment 26 may be removed by simply applying pressure to the front of the compartment which causes the compartment to pop out for removal and replacement of the batteries without having to remove the transmitter from the wall. The flashing low-battery indicator LED 86 is switched on two weeks before activation of the fail safe described hereinabove so that a user is notified of the need to replace the batteries in the transmitter.

A similar fail safe mechanism is employed in conjunction with the receiver/pc board 20 illustrated in FIG. 9. Approximately four weeks prior to battery failure in the receiver/pc board battery compartment 24 an audible beep is triggered to notify a user of the need to replace the batteries therein. Approximately two weeks prior to battery failure, the fail safe is triggered as described previously in association with the transmitter, and the security system is unlocked.

The battery compartment 24 is connected to the receiver/pc board, and the receiver/pc board is connected to the solenoid 56 via standard electrical connectors 88, 90 respectively. To prevent interference with or from other radio frequency transmissions, a standard DIP switch located on both the transmitter and receiver/pc board may be adjusted by a user. The battery compartment 24 is designed to connect to a pair of receiver/pc boards (only one of which is illustrated in FIGS. 1 and 9), each of which is then connected to a solenoid 56 in a lock set 47 (see FIGS. 4 and 5). The receiver/pc board comprises an antennae 94 which receives the signal transmitted from the transmitter 22 (see FIGS. 1 and 8) and a pc board (not shown) which operates the solenoid, and triggers the fail safe warning and actuation when the battery power in compartment 24 is low.

While the invention is described and illustrated here in the context of a preferred embodiment, the invention may be embodied in many forms without departing from the spirit of the essential characteristics of the invention. The present embodiment is therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A remotely releasable security system comprising:

a security barrier positioned across a window opening;

a locking mechanism for releasably securing the security barrier to a window frame which defines the window opening, wherein the locking mechanism comprises one or more male/female lock sets in line with corresponding shear pin interference mechanisms;

a radiant energy receiver operably connected to the locking mechanism; and a radiant energy remote control for signaling the receiver to release the locking mechanism.

2. A remotely releasable security system as defined in claim 1 wherein the radiant energy is within the radio frequency spectrum.

3. A remotely releasable security system as defined in claim 1 wherein the security barrier is selected from the group consisting of security glass and security screen.

4. A remotely releasable security system comprising:

a security barrier positioned across a window opening; and a locking mechanism for releasably securing the security barrier to a window frame which defines the window opening, wherein the locking mechanism comprises one or more male/female lock sets in line with corresponding shear pin interference mechanisms.

* * * * *